United States Patent

Ward

[15] 3,696,309
[45] Oct. 3, 1972

[54] FLASH LAMP Q-SWITCHED LASER SYSTEM

[72] Inventor: Robert W. Ward, Dallas, Tex.

[73] Assignee: Texas Instruments Incorporated, Dallas, Tex.

[22] Filed: Oct. 30, 1970

[21] Appl. No.: 85,577

[52] U.S. Cl................................331/94.5, 350/160 R
[51] Int. Cl.................................................H01s 3/00
[58] Field of Search......................331/94.5; 350/160

[56] References Cited

UNITED STATES PATENTS

| | | | |
|---|---|---|---|
| 3,321,714 | 5/1967 | Tien | 331/94.5 |
| 3,493,888 | 2/1970 | Jackson | 331/94.5 |
| 3,134,837 | 5/1964 | Kisliuk et al. | 331/94.5 |
| 3,500,234 | 3/1970 | Goedertier | 331/94.5 |
| 3,581,230 | 5/1971 | Smith | 331/94.5 |

Primary Examiner—Ronald L. Wibert
Assistant Examiner—Edward S. Bauer
Attorney—James O. Dixon, Andrew M. Hassell, Harold Levine and Rene E. Grossman

[57] ABSTRACT

A Q-switch for a solid-state laser system is provided by a gas-filled flash lamp within the optical feedback path of the laser system. One embodiment utilizes the opaque region of an ionized flash lamp to interrupt the optical feedback path during the early portion of the laser rod pumping cycle. Feedback is restored by deionizing the flash lamp.

A second embodiment utilizes an auxiliary feedback loop to control the rate at which the intensity of the laser radiation within the feedback system increases. An ionized flash lamp having a light saturable characteristic is included in the primary feedback loop. The auxiliary feedback loop is adjusted such that the ionized flash lamp optically saturates at a predetermined time. Saturation of the flash lamp increases feedback, thereby causing the flash lamp to function as a Q-switch element.

6 Claims, 8 Drawing Figures

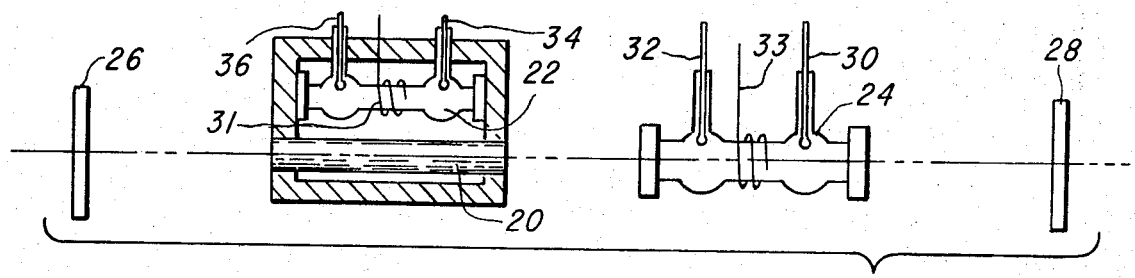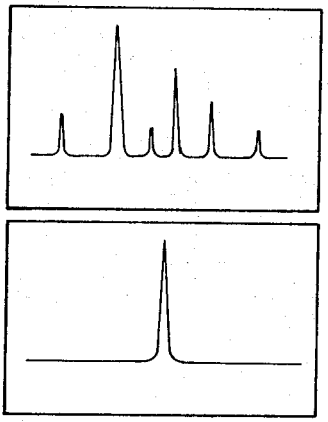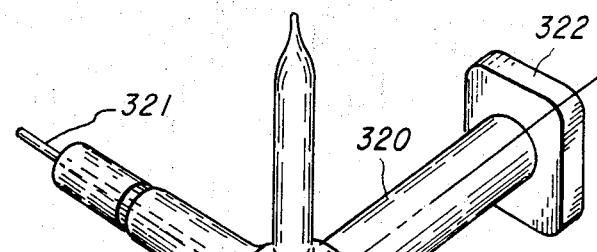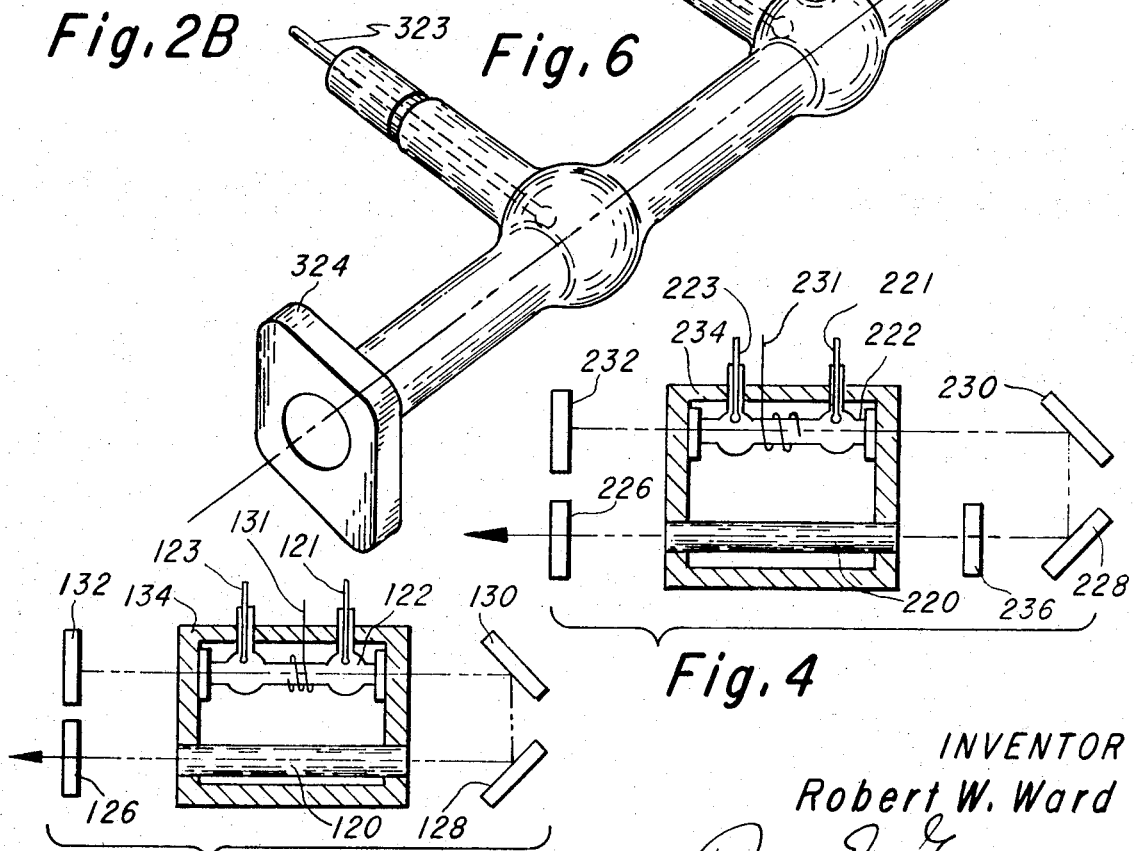

FLASH LAMP Q-SWITCHED LASER SYSTEM

BRIEF DESCRIPTION OF THE INVENTION AND BACKGROUND INFORMATION

A wide variety of laser systems are currently known and used. Most of the fundamental differences between these systems involve variations in the light sources and the laser materials used. Some of the laser materials currently used are gases, glass and semiconductors. Suitable light sources include various types of flash lamps and arrays of light-emitting solid-state diodes.

A laser system is an oscillator operated in the infrared, the visible, or the ultraviolet portions of the frequency spectrum. The fundamental portions of any laser system is an amplifier utilizing the principle of "light amplification by stimulated emission of radiation" and an optical feedback loop in which a portion of the output of the amplifier is fed back into the input of the amplifier for further amplification thereby causing the system to oscillate.

A laser rod in which the atoms have been pumped to a high energy state by the absorption of light from an external source can emit light radiation by two processes. The first process is known as spontaneous radiation. This is a process in which atoms of the laser rod spontaneously revert from a high energy state to a lower energy state without any further outside stimulus with the difference between the energy of the two states being radiated as light. The second process is known as stimulated emission of radiation. This is a process in which light radiation impinges upon atoms of the laser rod which have been pumped to the high energy level by absorption of light from an external source. This light stimulates these atoms to change from their high energy state to a lower energy state with the difference between the two energy states being emitted as light radiation. The wavelength of the light resulting from the stimulated emission will be the same as the light stimulating the emission.

In typical systems the portion of the output resulting from spontaneous radiation is small as compared to the output resulting from the stimulated emission of radiation process. However, it should be emphasized that without spontaneous radiation no oscillation would occur and the system would be inoperative.

In typical laser systems, a high intensity light source is used to illuminate a laser rod. Portions of the light energy from the source is absorbed by the laser rod causing the atoms of the laser rod to change from their lower energy state to a higher energy state. Mirrors are positioned such that the radiation which is emitted along the longitudinal axis of the laser rod by spontaneous radiation will be reflected back through the laser rod causing more light to be emitted by the stimulated emission process. Each time this radiation is reflected back through the laser rod, the output increases due to the stimulated emission process. The intensity of the light in the feedback loop continues to build up through this process until an equilibrium point is reached between the amount of energy absorbed from the light source by the laser rod and the amount being radiated by the laser rod in the form of either spontaneous or stimulated emission. Useful output of the laser system is obtained by making one of the mirrors in the feedback loop only partially reflective so that a portion of the light will be transmitted through the mirror as a high intensity light beam with a second portion being reflected back into the feedback loop to maintain the emission process.

In the above described systems, the light source in conjunction with the laser rod constitute the amplifier. The mirrors form a feedback system coupling a portion of the amplifier output back to the amplifier input.

Lasers operate in two fundamental modes. These modes are the continuous mode in which the light output is uninterrupted and the pulse mode in which the output is a series of short pulses. The preferred mode of operation will depend on the application for which the laser system is designed. If the application indicates that a pulsed laser system should be used and that the output pulse should be a high energy pulse of relatively short duration, the current state of technology requires that the laser system include some type of Q-switch element.

A Q-switch element is an element placed in the optical feedback path of the laser system and having characteristics which permit the optical feedback of the laser system to be interrupted during the early portions of the laser rod pumping cycle. This interruption of the feedback path assures that the laser rod will store sufficient energy to emit a high peak power pulse at the time the resonator Q is switched and the stimulated emission process occurs.

Typical prior art Q-switch elements include the Kerr cell, the Pockels cell, rotary or vibrating reflectors, and saturable absorbers. The Kerr and Pockels cells are electro-optic devices while prior art saturable absorbers are typically organic dyes which become more transparent with increasing levels of light.

The electro-optic devices, such as the Kerr and Pockels cells, are mechanically fragile and require high voltage sources. The mechanical Q-switch elements such as the rotating or vibrating reflectors have mechanical problems due to the high rate at which the reflector must rotate or vibrate. Prior art saturable absorbers such as organic dyes involve chemical reactions which are not totally reversable. These undesirable characteristics have made prior art Q-switch elements low reliability, high maintenance items.

The laser system according to the present invention advantageously solves the problems associated with prior art Q-switched lasers by providing a Q-switched laser system in which the Q-switching element is a flash lamp. The Q-switch elements utilize either the light blocking or the saturable absorber characteristics of an ionized gas-filled flash lamp often referred to as a laser flash tube.

In one embodiment, the Q-switch element is a flash lamp positioned within the optical feedback path of the laser system. A second flash lamp is used as a light source to optically pump the laser rod. Two voltage sources are used, one for the flash lamp which is used as the Q-switch element and one for the light source used to optically pump the laser rod.

Another embodiment provides a laser system in which a single flash lamp is used as the light source to optically pump the laser rod and also as the Q-switch element.

A still further embodiment includes a second or auxiliary optical feedback path which causes the laser radiation in the feedback loop to build up at a controlled rate such that a flash lamp in the optical feedback path is caused to optically saturate, at a predetermined time, thereby causing the feedback to increase. The rate at which the laser radiation builds up is varied by adjusting the auxiliary optical feedback loop. This loop is preferably adjusted so that the laser output is a single high intensity pulse. In this embodiment a single flash lamp may be used as both the pump source and as a saturable absorber Q-switch element.

The primary function of a Q-switch element in a pulsed laser system is to reduce the optical feedback during a selected portion of the period during which the laser rod is being pumped. As the laser rod is being pumped, the laser rod is storing energy in the form of elevated energy states of the atoms of the laser rod. When sufficient energy is stored in the laser rod, the feedback path is restored and the atoms of the laser rod fall to a lower energy state, with the difference between these energy states being radiated as light through laser action.

Each of the above discussed embodiments utilizes the change in the light transmitting characteristics of a gas-filled flash lamp to control the optical feedback path of the laser system. When two flash lamps are used, one to optically pump the laser rod and the second as a Q-switch element, as in the first embodiment discussed above, the flash lamps are preferably connected to separate power sources with the ionization times synchronized such that the restoration of the optical feedback loop occurs at an optimum time after the flash lamp which is used as the pump source is ionized.

An object of the invention is to provide a laser system in which a flash lamp is used both as the light source and the Q-switch element.

Another object of the invention is to provide a laser system in which the Q-switch element is a saturable absorber.

Another object of the invention is to provide a Q-switch system having no moving mechanical parts.

These and other objects of the invention will be more clearly understood in view of the attached drawings and detailed descriptions.

BRIEF DESCRIPTION OF THE DRAWINGS

FIG. 1 is a schematic diagram of a laser system having separate flash lamps for the pump source and the Q-switch element.

2A 2and 2B are waveform diagrams respectively illustrating the output of a non-Q-switched laser and a Q-switched laser.

FIG. 3 is a schematic diagram of a laser system using a single flash lamp as both the pump source and the Q-switch element.

FIG. 4 is a schematic diagram of a laser system having two optical feedback loops.

Figure 5:
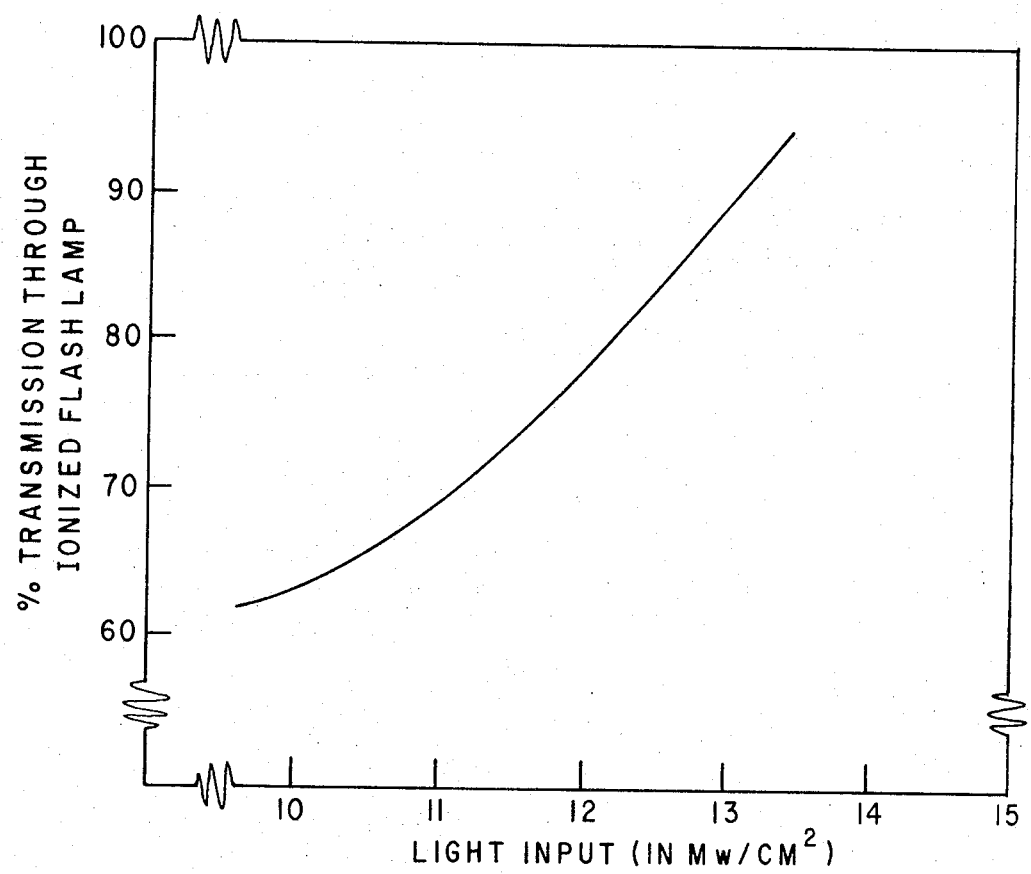

FIG. 5 is a curve showing the percent of light transmitted through an ionized flash lamp as a function of the intensity of the light input.

FIG. 6 is an isometric drawing of a flash lamp.

Figure 7:
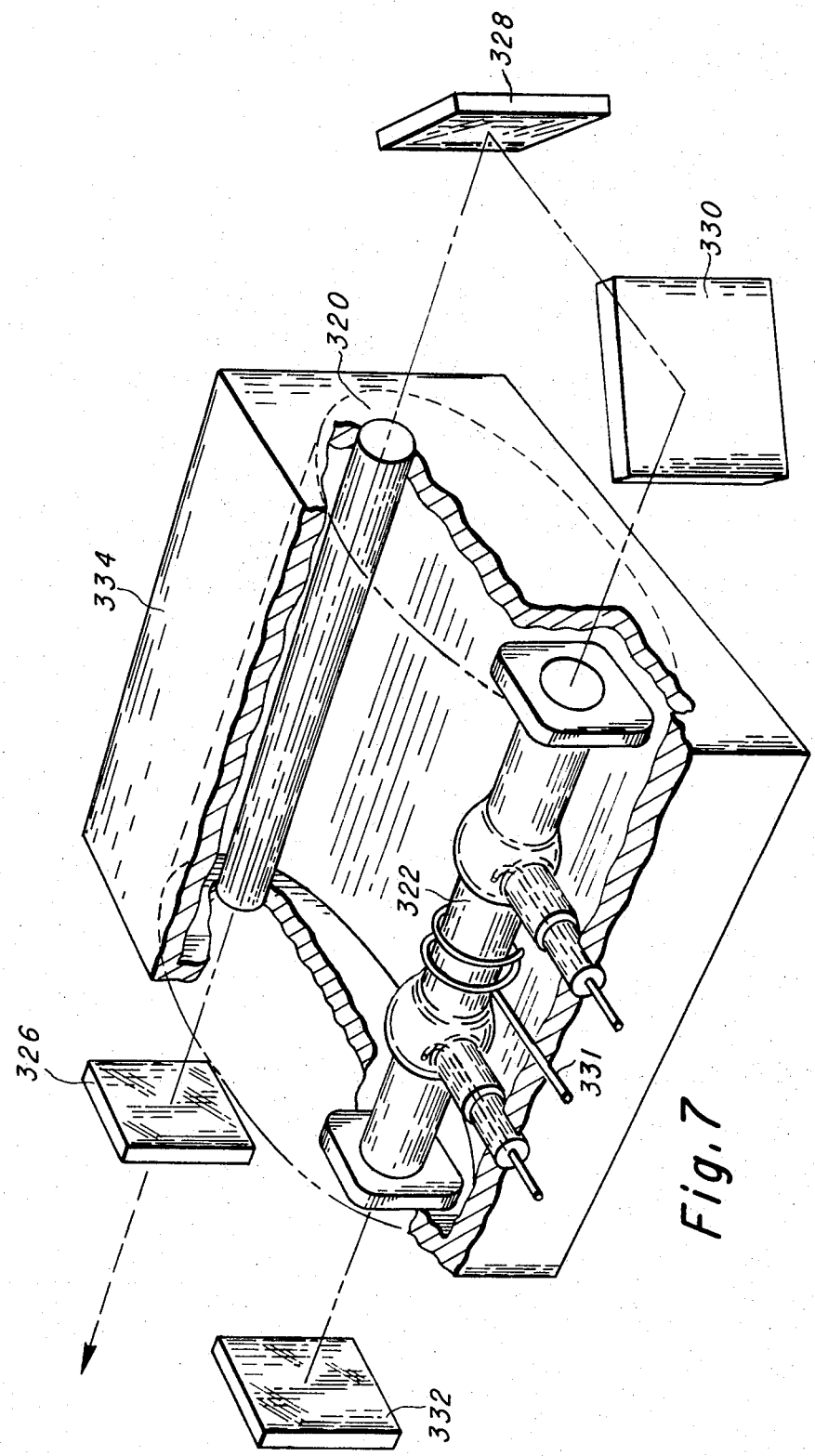

FIG. 7 is an isometric diagram of a laser system including a flash lamp, a laser rod, primary feedback mirrors, all of which are suitable for use in the illustrated embodiments of this invention.

DETAILED DESCRIPTION

The laser system which is the subject of this invention advantageously solves many of the problems associated with prior art Q-switched laser systems by providing a laser system in which the Q-switch element is a gas-filled flash lamp. One embodiment of the system is illustrated schematically in FIG. 1 and includes a laser rod 20, a flash lamp pump source 22, a flash lamp Q-switch element 24, flash lamp trigger or coils 31 and 33, and two mirrors 26 and 28 forming the optical feedback path. The laser rod is of neodymium doped yttrium-aluminum-garnet (YAG), ruby, or a similar material.

The two flash lamps 22 and 24 are preferably connected to two voltage sources (now shown). One voltage source is connected to the leads 30 and 32, of flash lamp 24. A second voltage source is connected to leads 34 and 36 of flash lamp 22. The time at which the flash lamps ionize is controlled by synchronizing unit (not shown). The synchronizing unit preferably provides two signals, one coupled to trigger coil 31 for controlling the ionization time of flash lamp 22, and second signal coupled to trigger coil 33 for controlling the ionization time of flash lamp 24. As the Q-switch element, flash lamp 24, ionizes it becomes opaque and interrupts the optical feedback loop which is established by mirrors 26 and 28. The trigger signals applied to the flash lamps 24 and 22 are synchronized such that the Q-switch element flash lamp 24 is ionized before the flash lamp 22, which is used to optically pump the laser rod 20. The deionization of the flash lamps is normally controlled by reducing the potential applied to the leads of the flash lamps. In this system the voltage sources (not shown) are preferably adjusted such that the Q-switch element flash lamp 25 is deionized before the pump source flash lamp 22. The proper time relationship between the trigger signals and the characteristics of the voltage sources depends on the laser rod and the flash lamps used, and may be determined experimentally. FIG. 2B illustrates the output of a properly synchronized Q-switched laser system. FIG. 2A illustrates the output of a non-Q-switched (normal mode) pulsed laser system.

An alternate system design permits a single flash lamp to be used for the light source and the Q-switch element. Such a system is schematically illustrated in FIG. 3 and includes a laser rod 120, flash lamp 122 mounted in a cavity structure 134, with mirrors 126, 128, 130 and 132 defining an optical feedback path through the laser rod 120 and the flash lamp 122. Mirrors 128, 130 and 132 are fully reflecting mirrors while the output mirror 126 is partially reflecting.

The leads 121 and 123 of the flash lamp 122 are connected to a voltage source (not shown). The flash lamp 122 is triggered at the system pulse rate by applying a trigger signal to trigger coil 131. When a high voltage is applied to the leads 121 and 123 and a trigger signal to coil 131 of flash lamp 122, the gas in the flash lamp 122 ionizes and the high voltage source discharges through it, causing it to become opaque, thereby interrupting the optical feedback path of the laser system. During this interruption, the light output of the flash lamp 122 is high and the atoms of the laser rod 120 are pumped to their higher energy state. After a population inversion of the atoms of the laser rod 120 has been created by the pumping action of the ionized flash lamp, the voltage applied to the flash lamp leads 121 and 123 is reduced sufficiently to deionize flash lamp 122. As flash lamp 122 is deionized, it becomes transparent, thereby restoring the optical feedback path causing the energy stored in the laser rod 120, in the form of the population inversion of the atoms of the laser rod 120, to be released in the form of laser radiation.

Another embodiment of the invention is illustrated schematically in FIG. 4 and includes a laser rod 220, mirrors 226, 228, 230, 232 and 236, flash lamp 222, and a laser cavity structure 234. The output mirror 226 and the auxiliary feedback mirror 236 are partially reflecting. The back mirror 232 and the reflecting mirrors 228 and 230 are fully reflecting. This arrangement provides two optical feedback paths; the first or primary feedback path extending from the output mirror 226 to the back mirror 232, the second or auxiliary feedback path extending from the output mirror 226 to the auxiliary mirror 236.

The flash lamp 222 serves as a light source to pump the laser rod and also as a saturable absorber Q-switch element. As previously discussed, the essential characteristic of a saturable absorber Q-switch element is that the Q-switch element must become increasingly transparent as the intensity of the light radiation impinging upon the Q-switch element increases.

In the system illustrated in FIG. 4, the flash lamp is ionized by placing a proper voltage between the leads 221 and 223 of flash lamp 222 and applying a trigger voltage to the trigger coil 231. As the flash lamp ionizes, the light output of the flash lamp increases with a portion of this light being absorbed by the laser rod 220, thereby causing the atoms of the laser rod to change from a low level energy state to a high level energy state. Some of the atoms of the laser rod will spontaneously change from their high energy state to their low energy state by the spontaneous radiation process and emit a small amount of light. Some portion of this light will emerge from the laser rod 220 along the longitudinal axis of the laser rod and impinge on the output mirror 226 or the auxiliary mirror 236. In either case, a small portion of this light will be reflected back through the laser rod along its longitudinal axis and cause additional light to be emitted from the laser rod along the longitudinal axis by the process of stimulated emission of radiation. This process continues and the intensity of the radiation in the feedback loop increases with each pass of the light through the laser rod 220. A portion of the light impinging upon output mirror 226 is transmitted through this mirror as an output of the system while a portion of the light impinging on auxiliary mirror 236 passes through this mirror and is deflected 180 degrees by two reflecting mirrors, 228 and 230, and passes longitudinally through flash lamp 222, impinging on the back mirror 232 where it is totally reflected back along the same path. In the early portion of the pumping cycle the ionized flash lamp 222 is essentially opaque and the auxiliary feedback loop provides essentially all the feedback. However, as the intensity of the light in the feedback loop increases, the absorption of flash lamp 222 saturates, allowing it to become more transparent, thereby increasing the feedback to a very high level at a controlled rate.

By adjusting the reflectivity of the output mirror 226 and the auxiliary mirror 236 and the distance between these mirrors, the overall system feedback can be made very low during the early portion of the pumping cycle and very high during the latter portions of the cycle due to the saturable absorption characteristics of the ionized flash tube. As previously discussed this change in feedback level is the principal function of a Q-switch element. It is noted that for some applications, it may be advantageous to interchange mirrors 232 and 226.

The above discussed system depends on the saturable absorption characteristics of an ionized flash lamp. A generalized characteristic for such a lamp is shown in FIG. 5. The curve shown in FIG. 5 was measured for a typical xenon filled flash lamp. The characteristics of a particular lamp will vary with the structural details of the particular lamp; however, the saturable absorption characteristic may be an inherent feature of all gas filled flash lamps.

FIG. 6 illustrates a flash lamp suitable for use in the above discussed laser systems. The flash lamp is conventional in design; however, the endplates of the flash lamps 322 and 324 preferably have reasonably good optical qualities because the optical feedback path of the laser system is through these plates. For example, end plates with low transmission ratios or uneven surfaces tend to decrease the optical feedback of the laser system.

FIG. 7 illustrates a laser cavity structure 334 in which a laser rod 320 and a flashlamp 322 having trigger coil 331 are mounted. The inner surfaces of the cavity are essentially elliptical in shape with the flash lamp 322 and the laser rod 320 mounted at the face of the foci. This mounting of the laser rod 320 and the flash lamp 322 assures that the light emitted by the flash lamp 322 will be focused on the laser rod 320. The inner surface of the cavity is preferably highly reflective. For example, this high reflectivity may be achieved by a highly polished coating of silver on this surface. Other coatings may also be used. Also included is an output mirror 326, two reflecting mirrors, 328 and 330, and a back mirror 332. The cavity structure 334, the flash lamp 322, the laser rod 320, and the mirror 326, 328, 330 and 332 are suitable for use in any of the disclosed embodiments of this invention. Alternately, the mirrors might be incorporated by being formed directly on an end of the laser rod or an end of the flash lamp.

No general theory has been developed to adequately explain the light blocking characteristic of an ionized flash lamp for relatively low levels of light or the light saturable characteristic for higher levels of light. However, it has been shown that these characteristics can be used as an effective Q-switch in pulsed laser systems.

The present invention has been described and defined in detail and illustrated in preferred embodiments. It will be apparent, therefore, to one skilled in the arts herein encompassed that many changes and modification are possible within the ordinary skill of such artisans without departing from the scope of the invention as described and defined.

What is claimed is:

1. A Q-switched pulse pumped laser system comprising:
   a. an optical cavity;
   b. a laser flash tube mounted in the optical cavity for optically pumping and Q-switching the laser;

c. a laser rod mounted in the optical cavity responsive to the output of the laser flash tube for generating stimulated emission energy pulses; and d. an optical feedback means for feeding back the stimulated emission energy through the laser rod and laser flash tube.

2. A laser system according to claim 1 wherein said optical feedback means includes reflector means positioned in the feedback path between the laser rod and the laser flash tube for directing the stimulated emission energy received from the laser rod through the laser flash tube for Q-switching.

3. A laser system according to claim 2 wherein said optical feedback means further includes a partially reflecting means in the feedback path between the laser rod and the laser flash tube for selective feedback of spontaneous emission energy to the laser rod for controlling the timing of Q-switching.

4. A laser system according to claim 1 wherein said cavity includes a highly reflective inner surface.

5. A laser system according to claim 4 wherein said highly reflective inner surface comprises a high polished coating of silver.

6. A laser system according to claim 5 wherein said cavity inner surface is elliptically shaped and said laser flash tube and laser rod are mounted at the face of the foci.

* * * * *